Aug. 24, 1937.  L. RICEFIELD  2,091,160
COUPLING
Filed Dec. 28, 1935  2 Sheets-Sheet 1
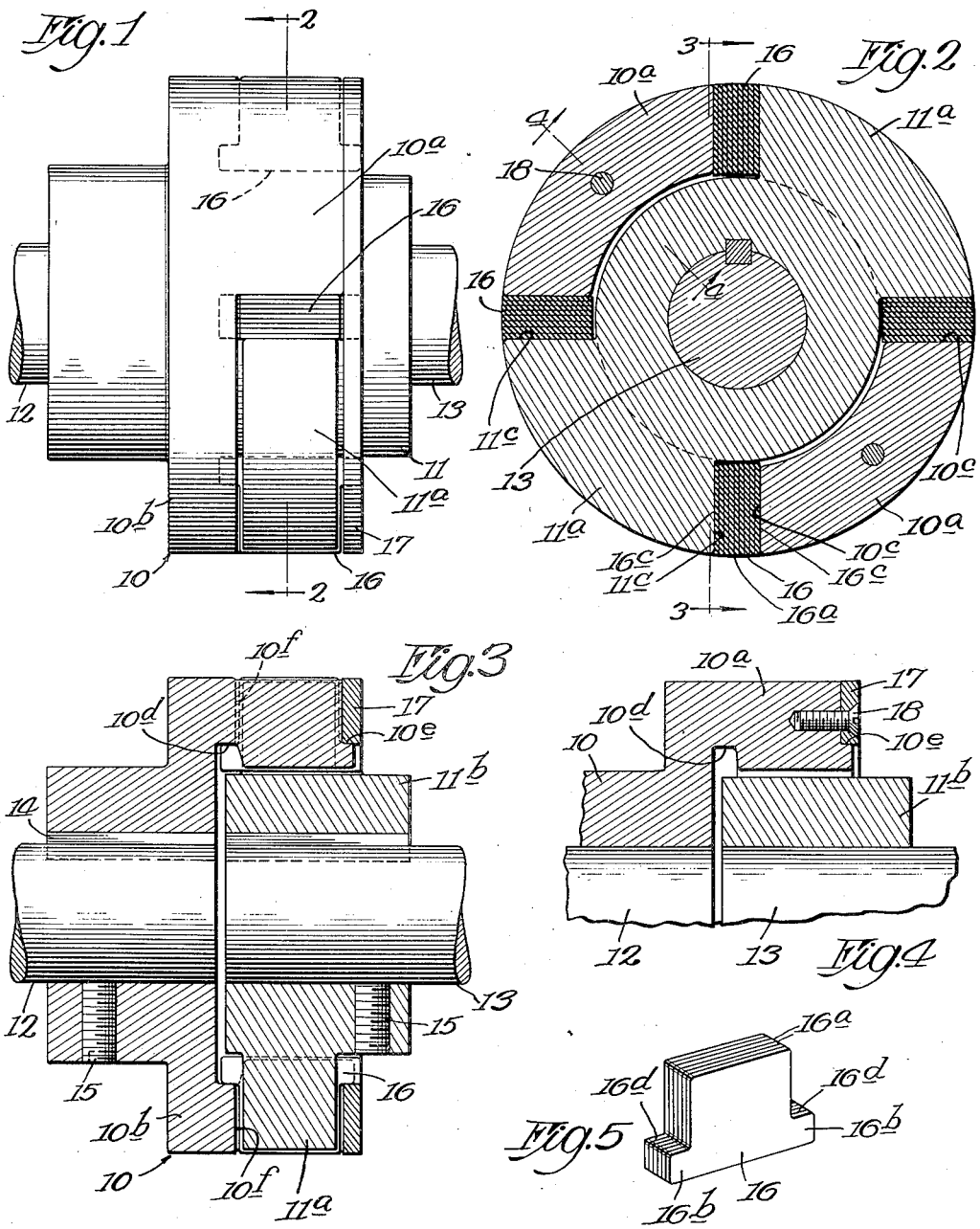
Inventor
Louis Ricefield
By Davis, Macauley, May, Lindsey & Smith, Attys.

Aug. 24, 1937.                L. RICEFIELD                 2,091,160
                                COUPLING
                         Filed Dec. 28, 1935              2 Sheets-Sheet 2
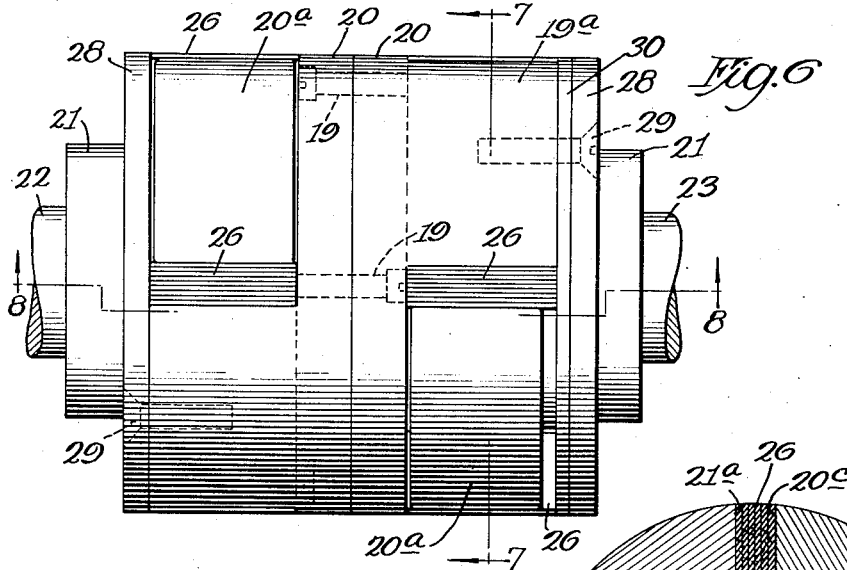
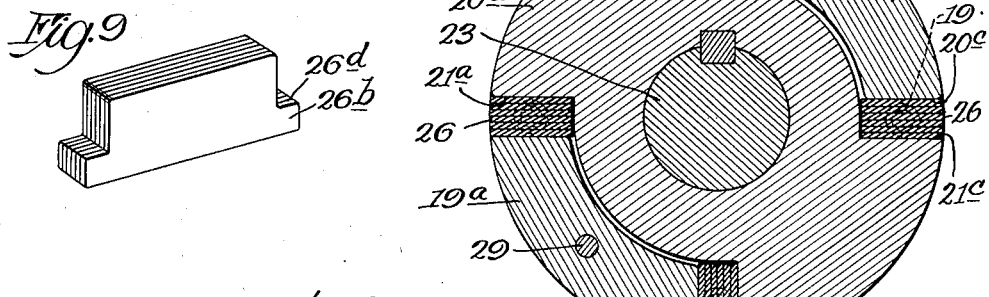
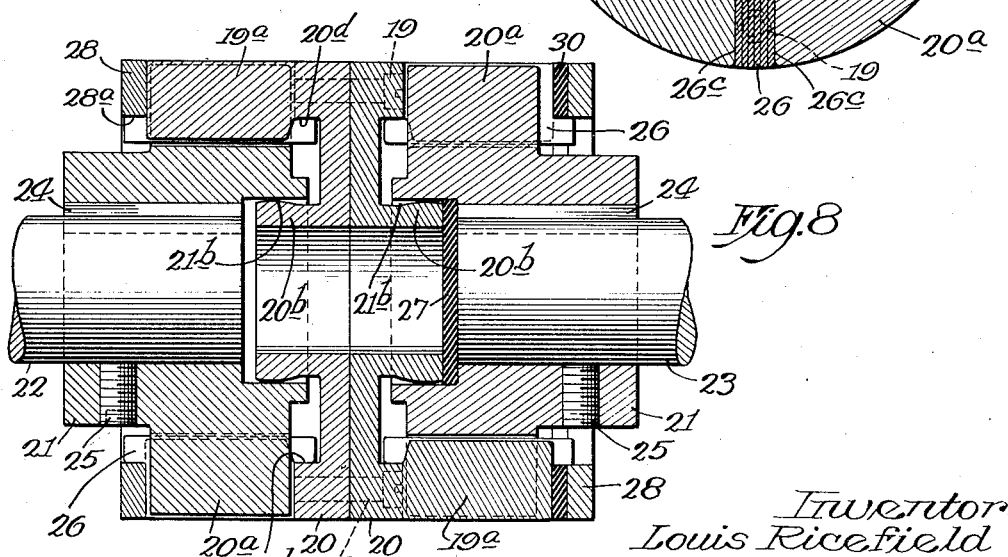
Inventor:
Louis Ricefield
By Davis, Macauley, May, Lindsey & Smith, Attys.

Patented Aug. 24, 1937

2,091,160

UNITED STATES PATENT OFFICE 2,091,160

COUPLING

Louis Ricefield, Oak Park, Ill.

Application December 28, 1935, Serial No. 56,523

12 Claims. (Cl. 64—14)

This invention relates to improvements in couplings for connecting substantially aligned shafts and its purpose is to provide an improved device adapted to compensate for angular misalignment, lateral displacement and relative endwise movement of the shafts. The principal object of the invention is to provide an improved coupling comprising a pair of coupling members each adapted to be secured on one of the substantially aligned shafts and each having a plurality of lugs or jaws arranged to intermesh loosely with similar lugs or jaws carried by the other coupling member in combination with a plurality of separate power transmitting members, preferably formed partly or wholly of resilient material and each interposed between two lugs or jaws carried by opposite coupling members, said power transmitting members being retained in place by novel means which permits them to be conveniently removed and replaced independently of each other when desired. A further object of the invention is to provide an improved coupling of the type referred to which is particularly adapted for connecting vertically extending shafts and which embodies a retaining ring detachably secured to one of the coupling members and capable of being removed endwise along one of the shafts to permit the separate withdrawal of the power transmitting members by movement longitudinally of the shafts. Another object of the invention is to provide an improved coupling comprising a pair of coupling members of the type referred to in combination with a plurality of separate power transmitting members provided with shoulders adapted to coact with shoulders formed on one of the coupling members to retain them during their outward movement under the influence of centrifugal force during the rotation of the coupling. A further object of the invention is to provide an improved coupling for connecting substantially aligned shafts comprising a coupling member adapted to be secured on one of said shafts and having lugs or jaws extending longitudinally therefrom, a second coupling member adapted to be secured on the other shaft and having lugs or jaws extending radially outward therefrom to intermesh loosely with the lugs or jaws of the first coupling member, in combination with separate power transmitting members each interposed between two of said lugs or jaws carried by opposite coupling members and retained in place by coaction with the hub of the second named coupling member and by shoulders which coact with other shoulders carried by said first named coupling member. A further object of the invention is to provide a coupling for connecting substantially aligned shafts comprising a plurality of pairs of coupling members each including one coupling member having substantially longitudinally extending jaws and another coupling member having radially extending jaws, said jaws intermeshing with each other and coacting with intermediate power transmitting members capable of being separately removed after the removal of annular retaining rings which are adapted to be detached and removed longitudinally of the connected shafts. Other objects relate to various features of construction and arrangement which will appear more fully hereinafter.

The nature of the invention will be understood from the following specification taken with the accompanying drawings, in which two embodiments are illustrated. In the drawings, Fig. 1 shows a side elevation of an improved form of coupling embodying the features of the present invention;

Fig. 2 shows a sectional view taken on the line 2—2 of Fig. 1;

Fig. 3 shows a longitudinal section taken on the line 3—3 of Fig. 2;

Fig. 4 shows a partial radial section taken on the line 4—4 of Fig. 2;

Fig. 5 is a perspective view of one of the power transmitting members embodied in the construction shown in Figs. 1 to 4, inclusive;

Fig. 6 shows a side elevation of a modified form of the invention in which a plurality of pairs of coupling members like those illustrated in Fig. 1 are embodied in one unitary construction for connecting two substantially aligned shafts;

Fig. 7 shows a sectional view taken on the line 7—7 of Fig. 6;

Fig. 8 shows a longitudinal section taken on the line 8—8 of Fig. 6; and

Fig. 9 is a perspective view of one of the power transmitting members embodied in the construction shown in Figs. 6, 7, and 8.

As illustrated in Figs. 1, 2, 3, 4, and 5 of the drawings, the invention is embodied in a coupling comprising a pair of coupling members 10 and 11 which are adapted to be secured upon a pair of substantially aligned shafts 12 and 13, respectively, by means of keys 14 and set screws 15. The coupling member 10 comprises a plurality of longitudinally extending jaws 10ª which are formed on the disk portion 10ᵇ of the coupling member and which are adapted to intermesh loosely with a plurality of jaws 11ª which extend radially outward from the hub portion 11ᵇ of the other coupling member. The jaws of these coupling members are adapted to receive between them a plurality of power transmitting members 16 which are in the form of separate blocks each preferably formed of resilient material and each provided with opposite faces 16ᶜ which are adapted to coact with the faces 10ᶜ and 11ᶜ which are formed on the lugs or jaws of the coupling members 10 and 11, respectively. The opposite faces 16ᶜ of each power transmitting member may be parallel to each other as in the embodiment illustrated or they may diverge outwardly as flat or curved surfaces in the manner disclosed in my copending application Serial No. 739,419, filed August 11, 1934. Each of the blocks 16 is preferably made up of a plurality of parallel laminations 16ᵃ which may be layers of rubber, rubberized duck, leather or other resilient material vulcanized, cemented or otherwise secured together.

In the embodiment illustrated, the laminations extend transversely to the directions in which forces are transmitted from one coupling member to the other. The power transmitting members 16 are held against inward movement by the proximity of the peripheral surface of the hub 11ᵇ of the coupling member 11 and for the purpose of retaining them against outward movement under the influence of centrifugal force, they are provided at their inner margins with longitudinally extending projections 16ᵇ forming outwardly directed transverse shoulders 16ᵈ which are adapted to coact with shoulders carried by the coupling member 10. For this purpose, the coupling member 10 is provided with an annular shoulder 10ᵈ which is adapted to overlie one of the shoulders 16ᵈ on each of the power transmitting members. In addition, a retaining ring 17 is detachably secured to the end faces of the jaws 10ᵃ by means of screws 18. The inner portion of each jaw 10ᵃ extends longitudinally to form a shoulder 10ᵉ which coacts with the inner edge of the ring 17. The power transmitting members 16 fit loosely between the ring 17 and the faces 10ᶠ of the coupling member 10 which extend between the jaws 10ᵃ and they are thus permitted to adjust themselves to compensate for lack of alignment of the connected shafts during the rotation of the coupling. The ring 17 and the faces 10ᶠ retain the blocks 16 against endwise movement and the shoulders 16ᵈ engaging the ring 17 and the shoulders 10ᵈ retain the blocks against outward movement. When it is desired to remove any one of the power transmitting members 16, this may be done by withdrawing the screws 18, removing the ring 17 longitudinally of the shaft 13 and then withdrawing any desired block 16. When assembling the coupling on the shafts, the ring 17 should, of course, be disposed on that side of the coupling which is accessible for the removal of the blocks.

In Figs. 6, 7, 8, and 9 of the drawings, there is illustrated a modification in which the features of construction described above are embodied in a coupling comprising a plurality of pairs of coupling members, a form which may desirably be employed when there is a considerable degree of misalignment of the shafts. In this form, a pair of coupling members 20 which are generally similar to the coupling members 10 previously described are secured together, back to back, by screws 19 and their longitudinally extending lugs or jaws 19ᵃ are adapted to intermesh loosely with the radially extending lugs or jaws 20ᵃ of two other coupling members 21 which correspond generally to the coupling members 11 previously described and which are secured upon a pair of substantially aligned shafts 22 and 23 by means of keys 24 and set screws 25. The jaws of each coupling member 20 are adapted to receive between them and the jaws of the next adjacent coupling member 21 the power transmitting members 26 which are in the form of rectangular blocks having opposite parallel faces 26ᶜ to coact with the corresponding faces 20ᶜ and 21ᶜ formed on the jaws 20ᵃ and 21ᵃ, respectively. The screws 19 are located in alignment with the apertures occupied by the blocks 26 so that after the right-hand set of blocks, as viewed in Fig. 8, has been removed, access may be had to the heads of the screws 19 for removing them. The coupling members 20 are provided with longitudinally extending hub portions 20ᵇ which extend into the enlarged bores 21ᵇ of the coupling members 21. The outer surfaces of these hub portions of the coupling members 20 are rounded and they loosely engage the coupling members 21 so that they may adjust themselves to the misalignment of the shafts 22 and 23. If desired, a disk of cushioning material 27, such as rubber or the like, may be interposed between the end of each of the hub portion 20ᵇ and the end of the adjacent shaft 22 or 23.

The power transmitting members 26 are retained against inward movement by the hubs of the coupling members 21 and they are retained against outward movement by projections 26ᵇ which are formed thereon and which provide outwardly directed shoulders 26ᵈ adapted to coact with the annular shoulders 20ᵈ which are formed on the members 20 and with the inner margins 28ᵃ of retaining rings 28 which are secured to the ends of the jaws 20ᵃ by means of screws 29. If desired, a ring or gasket of cushioning material 30 may be interposed between one or both retaining rings 28 and the jaws to which they are attached so that these rings 30 will be engaged by the end faces of the cushioning members 26. It will be seen that in this form of the construction, the ring 28 may be detached and removed longitudinally of the shafts to permit access to the power transmitting members 26 which may be individually removed and replaced. After the right-hand set of blocks 26, as viewed in Fig. 8, has been removed, the screws 19 may be detached and then, after shifting the right-hand coupling member 21 longitudinally of its shaft 23, the cooperating coupling member 20 may be removed transversely of the axis of rotation.

Although certain forms of the invention have been shown and described by way of illustration, it will be understood that the invention may be constructed in various other embodiments coming within the scope of the appended claims.

I claim:
1. The combination in a coupling for connecting two substantially aligned shafts and permitting relative endwise movement, lateral displacement and angular misalignment of said shafts, of a coupling member adapted to be operatively connected with one of said shafts and having a plurality of jaws extending longitudinally therefrom, a second coupling member adapted to be secured upon the other of said shafts and having a plurality of jaws extending radially outward to intermesh loosely with said first named jaws, and a plurality of resilient power transmitting members of non-circular cross section each interposed between and having flat power-transmitting faces adapted to contact with two of said jaws carried by opposite coupling members, said power transmitting members and said coupling members having coacting parts to prevent radial and endwise displacement of said power transmitting members.

2. The combination in a coupling for connecting two substantially aligned shafts, of a coupling member adapted to be operatively connected with one of said shafts and having a plurality of jaws extending longitudinally therefrom, a second coupling member adapted to be secured upon the other of said shafts and having a plurality of jaws extending radially outward to intermesh loosely with said first named jaws, and a plurality of power transmitting members of non-circular cross section each interposed between and having flat power-transmitting faces adapted to contact with two of said jaws carried by opposite coupling members, said power transmitting members having transversely extending shoulders, one of said coupling members having parts adapted to coact with said shoulders to prevent radial outward displacement of said power transmitting members, said shoulders being capable of a limited radial movement with respect to said parts.

3. The combination in a coupling for connecting two substantially aligned shafts, of a coupling member adapted to be operatively connected with one of said shafts and having a plurality of jaws extending longitudinally therefrom, a second coupling member adapted to be secured upon the other of said shafts and having a plurality of jaws extending radially outward to intermesh loosely with said first named jaws, and a plurality of power transmitting members of non-circular cross section each loosely interposed between and having flat power-transmitting faces adapted to contact with two of said jaws carried by opposite coupling members, said power transmitting members having shoulders at their ends, said first named coupling member having shoulders adapted to coact with said first named shoulders to prevent outward displacement of said power transmitting members, said shoulders being capable of a limited relative movement radially of the coupling.

4. The combination in a coupling for connecting two substantially aligned shafts to compensate for angular misalignment and relative lateral displacement of said shafts, of a coupling member adapted to be operatively connected with one of said shafts and having a plurality of jaws extending longitudinally therefrom, a second coupling member adapted to be secured upon the other of said shafts and having a plurality of jaws extending radially outward to intermesh loosely with said first named jaws, a plurality of resilient power transmitting members of non-circular cross section each interposed between and having flat power-transmitting faces adapted to contact with two of said jaws carried by opposite coupling members, and an annular ring detachably secured to one of said coupling members to prevent endwise displacement of said power transmitting members and of said second named jaws.

5. The combination in a coupling for connecting two substantially aligned shafts, of a coupling member adapted to be operatively connected with one of said shafts and having a plurality of jaws extending longitudinally therefrom, a second coupling member adapted to be secured upon the other of said shafts and having a plurality of jaws extending radially outward to intermesh loosely with said first named jaws, a plurality of power transmitting members each interposed between and contacting with two of said jaws carried by opposite coupling members, said power transmitting members being provided at their inner edges with longitudinally extending shoulders, said first named coupling member having shoulders to coact with one shoulder on each of said power transmitting members, and an annular retaining ring detachably secured to said first named coupling member and forming shoulders adapted to coact with the other shoulder on each of said power transmitting members.

6. The combination in a coupling for connecting two substantially aligned shafts, of a coupling member adapted to be operatively connected with one of said shafts and having a plurality of jaws extending longitudinally therefrom, a second coupling member adapted to be secured upon the other of said shafts and having a plurality of jaws extending radially outward to intermesh loosely with said first named jaws, a plurality of power transmitting members each interposed between and contacting with two of said jaws carried by opposite coupling members, said power transmitting members being provided at their inner edges with longitudinally extending shoulders, said first named coupling member having shoulders to coact with one shoulder on each of said power transmitting members, and a retaining ring detachably secured to the ends of said first named jaws and adapted to contact on its inner edge with the other shoulder on each of said power transmitting members.

7. The combination in a coupling for connecting two substantially aligned shafts, of a coupling member adapted to be operatively connected with one of said shafts and having a plurality of jaws extending longitudinally therefrom, a second coupling member adapted to be secured upon the other of said shafts and having a plurality of jaws extending radially outward to intermesh loosely with said first named jaws, a plurality of power transmitting members each interposed between and contacting with two of said jaws carried by opposite coupling members, said power transmitting members being provided at their inner edges with longitudinally extending shoulders, said first named coupling member having shoulders to coact with one shoulder on each of said power transmitting members, and a retaining ring detachably secured to the ends of said first named jaws and adapted to contact on its inner edge with the other shoulder on each of said power transmitting members, said second named coupling member having a hub adapted to prevent radial inward displacement of said power transmitting members.

8. The combination in a coupling for connecting two substantially aligned shafts, of a coupling member adapted to be operatively connected with one of said shafts and having a plurality of jaws extending longitudinally therefrom, a second coupling member adapted to be secured upon the other of said shafts and having a plurality of jaws extending radially outward to intermesh loosely with said first named jaws, a plurality of power transmitting members each interposed between and contacting with two of said jaws carried by opposite coupling members, said second named coupling member having a hub adapted to prevent radial inward displacement of said power transmitting members, said power transmitting members being provided with shoulders, and means including a detachable retaining ring carried by said first named coupling member for engaging said shoulders to prevent outward and endwise displacement of said power transmitting members.

9. The combination in a coupling for connecting two substantially aligned shafts, of a pair of coupling members each adapted to be secured upon one of said shafts and each having a plurality of radially extending jaws, a coupling device mounted between said shafts and having longitudinally extending jaws adapted to intermesh loosely with the jaws of each of said first named coupling members, and a plurality of power transmitting members each interposed between one of said jaws of said coupling device and one of said jaws of said first named coupling members, said coupling members and said power transmitting members having coacting parts adapted to prevent displacement of said power transmitting members.

10. The combination in a coupling for connecting two substantially aligned shafts, of a pair of coupling members each adapted to be secured upon one of said shafts and each having a plurality of radially extending jaws, a coupling device mounted between said shafts and having longitudinally extending jaws adapted to intermesh loosely with the jaws of each of said first named coupling members, a plurality of power transmitting members each interposed between one of said jaws of said coupling device and one of said jaws of said first named coupling members, said power transmitting members having shoulders at each end thereof, said coupling device having shoulders to coact with one shoulder on each power transmitting member, and a pair of retaining rings each detachably secured to the end of one series of jaws of said coupling device, said retaining rings being adapted to contact on their inner edges with the other shoulders on said power transmitting members.

11. The combination in a coupling for connecting two substantially aligned shafts, of a pair of coupling members each adapted to be secured on one of said shafts and each having a plurality of jaws extending radially outward therefrom, a second pair of coupling members detachably secured together between said first named coupling members and each having jaws extending longitudinally therefrom to intermesh loosely with the jaws of one of said first named coupling members, two series of resilient power transmitting members, each power transmitting member of one series being interposed between a jaw of one of said second named coupling members and a jaw of one of said first named coupling members and each power transmitting member of the other series being interposed between a jaw of the other first named coupling member and a jaw of the other second named coupling member, and means including retaining rings detachably secured to the ends of the jaws of said second named coupling members for retaining power transmitting members in engagement with the jaws between which they are positioned.

12. The combination in a coupling for connecting two substantially aligned shafts, of a pair of coupling members each adapted to be secured on one of said shafts and each having a plurality of jaws extending radially outward therefrom, a second pair of coupling members detachably secured together between said first named coupling members and each having jaws extending longitudinally therefrom to intermesh loosely with the jaws of one of said first named coupling members, two series of resilient power transmitting members, each power transmitting member of one series being interposed between a jaw of one of said second named coupling members and each power transmitting member of the other series being interposed between a jaw of the other first named coupling member and a jaw of the other second named coupling member, and means including retaining rings detachably secured to two of said coupling members for retaining said power transmitting members in engagement with the jaws between which they are positioned.

LOUIS RICEFIELD.